United States Patent [19]

Watanabe

[11] Patent Number: 4,748,394

[45] Date of Patent: May 31, 1988

[54] CONTROL APPARATUS FOR ESCALATOR

[75] Inventor: Eiki Watanabe, Inazawa, Japan

[73] Assignee: Mitsubishi Denki Kabushiki Kaisha, Japan

[21] Appl. No.: 875,212

[22] Filed: Jun. 17, 1986

[30] Foreign Application Priority Data

Jun. 18, 1985 [JP] Japan ................................ 60-132451

[51] Int. Cl.[4] ................................................ H02P 5/40

[52] U.S. Cl. .................................... 318/807; 318/798; 318/806; 198/330

[58] Field of Search ................................ 318/807-811, 318/729, 798, 806; 187/329 R; 198/322, 330

[56] References Cited

U.S. PATENT DOCUMENTS

| | | | |
|---|---|---|---|
| 2,106,833 | 2/1938 | Eames | 318/771 |
| 4,232,776 | 11/1980 | Dean | 198/322 |
| 4,249,120 | 2/1981 | Earle | 318/729 |
| 4,483,419 | 11/1984 | Salihi | 318/759 |
| 4,499,973 | 2/1985 | Delbrenzi et al. | 318/369 |
| 4,516,665 | 5/1985 | Watanabe | 187/29 R |
| 4,631,467 | 12/1986 | Herrmann et al. | 318/807 |

FOREIGN PATENT DOCUMENTS

| | | | |
|---|---|---|---|
| 58-6077 | 11/1977 | Japan | 318/778 |
| 57-85775 | 5/1982 | Japan . | |
| 58-112493 | 4/1983 | Japan | 318/778 |
| 58-23824 | 5/1983 | Japan . | |

*Primary Examiner*—David Smith, Jr.

*Attorney, Agent, or Firm*—Leydig, Voit & Mayer

[57] ABSTRACT

A control apparatus for an escalator wherein a low speed operation is performed in the absence of passengers at the escalator, and a high speed operation is performed in the presence of passengers at the escalator the alternating current of a three-phase A-C power source is converted by frequency conversion means into a three-phase alternating current of low frequency, with which an induction motor is energized to perform the low speed operation, so that the induction motor is rotated near a synchronous speed corresponding to the low frequency, to realize the low speed operation of high efficiency.

Moreover, when passengers have been detected, the frequency of the alternating current from the conversion means is gradually raised, and the conversion means is thereafter switched to the three-phase A-C power source upon detecting the synchronism of this alternating current with the alternating current of the three-phase A-C power source, so that smooth switching free from shocks becomes possible.

7 Claims, 4 Drawing Sheets

CONTROL APPARATUS FOR ESCALATOR

BACKGROUND OF THE INVENTION

This invention relates to an apparatus for the variable-speed control of an escalator.

Conventional control apparatus for escalators have employed a system wherein the escalator is usually held at a stop and is started when the presence of a user is detected by a photoelectric device or the like.

The reasons why the escalator is held stopped are to save energy and to extend the escalator's lifetime. In stores etc., however, there is the tendency that when the escalator is held stopped, the number of users thereof decreases to reduce the number of shoppers in the upper floors. Accordingly, a system has been considered wherein in the absence of a user, the escalator is operated at a low speed, while when a user appears, the escalator has its speed switched to a rated speed. Considered for this system is a method which switches the speeds by the use of an A-C two-speed motor, or a method in which the speed of the escalator is controlled by applying a device described in Japanese Utility Model Registration Application Publication No. 58-23824 and varying the primary voltage of a driving induction motor with thyristors or the likes.

The adoption of these methods, however, involves problems.

With the method using the A-C two-speed motor, two sorts of coils for the high speed and the low speed are employed, so that the motor has a large external shape and is difficult to be received in an escalator machinery room of limited space. Another problem is that a great shock develops at the switching of the speeds, so the product lifetime is rather shortened by frequenct switching operations.

On the other hand, although the primary voltage control can mitigate the shock at the switching of the speeds, the efficiency of the low speed mode is very inferior, and the temperature rises abnormally in the motor during ordinary use, so that a motor having a large capacity must be used. Another problem is that the control method is unfavorable from the standpoint of saving energy.

SUMMARY OF THE INVENTION

This invention has been made in view of the problems described above, and has for its object to provide a control apparatus for an escalator which can smoothly switch speeds and whose low speed mode is efficient.

This invention disposes a passenger detection device which detects the user of the escalator, and conversion means to convert the alternating current of a three-phase A-C power source into a three-phase alternating current of low frequency, whereby when there is no user, the escalator is operated at a low speed by the three-phase alternating current of low frequency, and when a user has been detected, the speed is gradually raised and the three-phase A-C power source is thereafter switched 'on' to operate the escalator at a high speed.

In the escalator control apparatus according to this invention, an induction motor is energized with the alternating current of low frequency produced by the conversion means, so that it is operated near the synchronous speed thereof even in the low speed mode.

BRIEF DESCRIPTION OF THE DRAWINGS:

FIGS. 1 thru 4 show an embodiment of a control apparatus for an escalator according to this invention, in which:

FIG. 1 is a connection diagram of electric circuitry;

FIG. 2 is a diagram for explaining the operation of the embodiment;

FIG. 3 is a block diagram showing the details of a switching circuit (22); and FIG. 4 is a flow chart of a program.

In the drawings, the same symbols indicate identical or corresponding portions.

Figure 1:
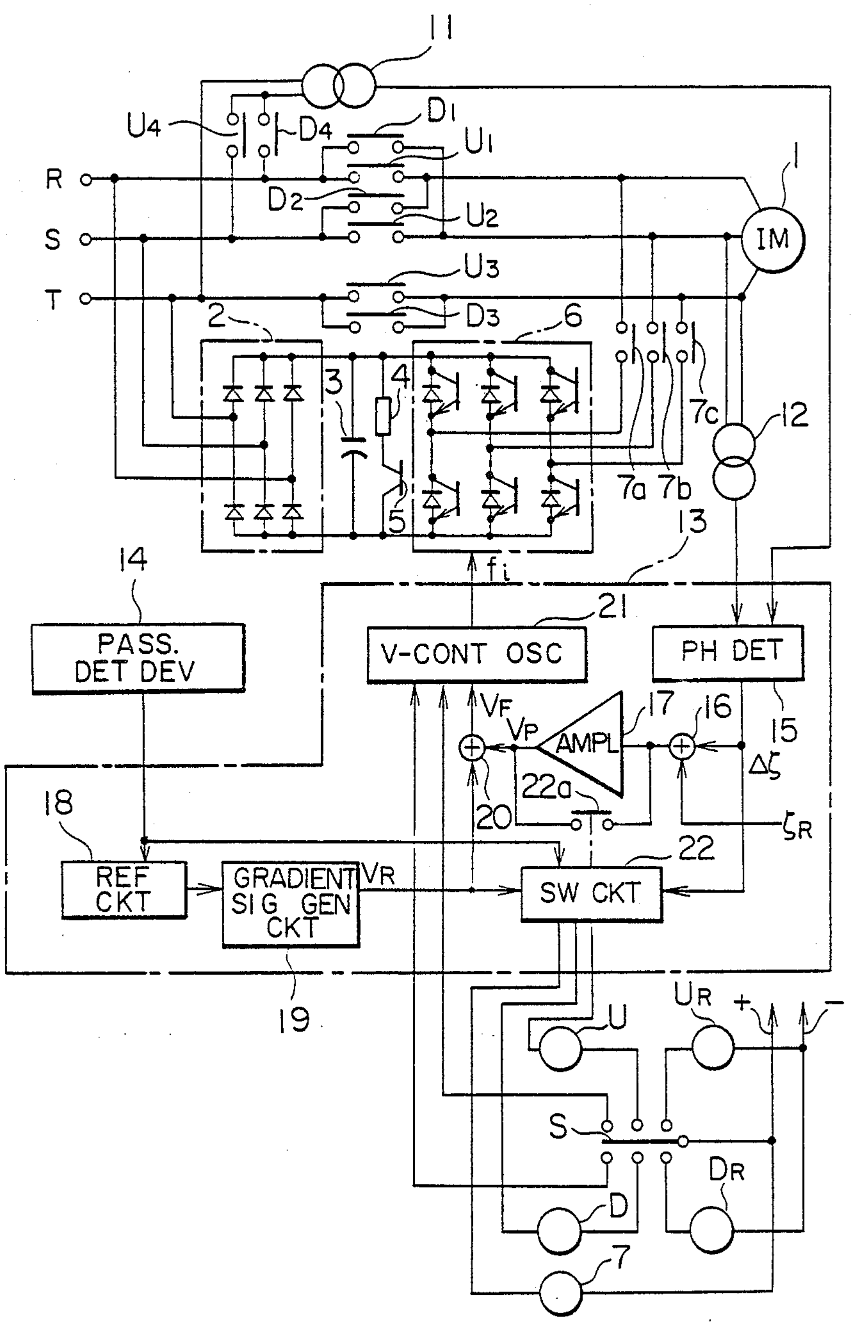
Figure 2:
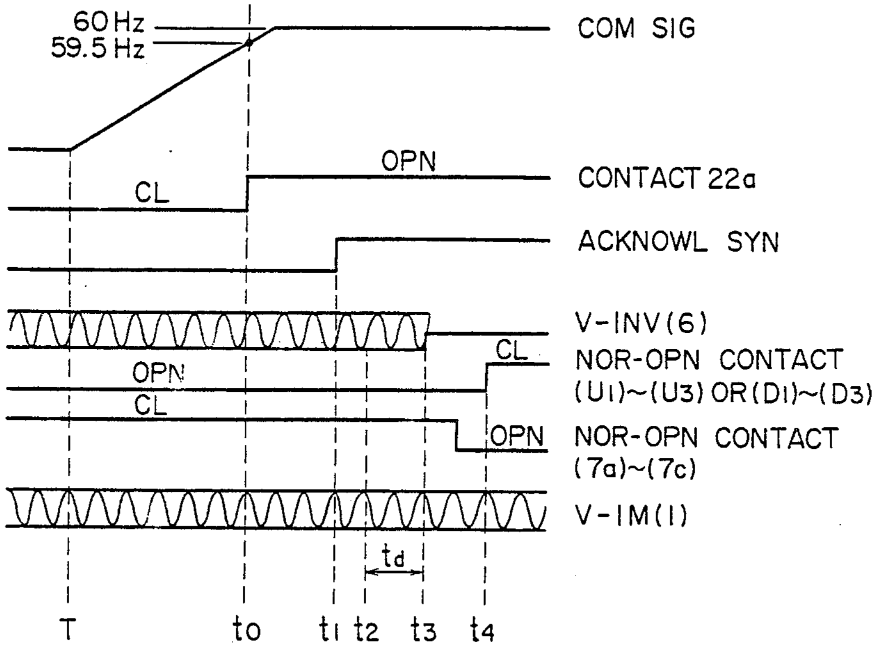

DESCRIPTION OF THE PREFERRED EMBODIMENT:

FIGS. 1 and 2 show an embodiment of this invention.

Referring to FIG. 1, letters R, S and T indicate the terminals of a three-phase power source, and symbols + and − denote the terminals of a control power source. Numeral 1 designates an induction motor which drives an escalator. Symbols $U_1$–$U_3$ denote the normally-open contacts of an up operation contactor U which is energized through an operation switch S, symbols $D_1$–$D_3$ the normallyopen contacts of a down operation contactor D which is similarly energized, symbol $U_4$ the normally-open contact of an up operation relay $U_R$, and symbol $D_4$ the normally-open contact of a down operation relay $D_R$. A converter 2 converts three-phase alternating current into direct current, a capacitor 3 serves for smoothing, a resistor 4 consumes regenerative power, and a switching transistor 5 is turned 'on' in a regenerative mode. Shown at numeral 6 is an inverter in the form of a conversion means to produce alternating current of variable frequency from the direct current generated by the converter 2 as well as the capacitor 3, the inverter being constructed of transistors as shown in this embodiment. A contactor 7 for the inverter has normally-open contacts *7a–7c*. Numerals 11 and 12 designate transformers. Numeral 13 designates an inverter control circuit which controls the inverter 6 so as to control the induction motor 1 on the basis of a signal from a passenger detection device 14.

The inverter control circuit 13 will now be described in detail. It includes a phase detector 15 which detects the phase difference $\Delta\phi$ between the three-phase alternating currents afforded by the three-phase A-C power source at R, S and T and the inverter 6, through the transformers 11 and 12. An adder 16 adds the phase difference signal $\Delta\phi$ and a bias signal $\phi_R$. An amplifier 17 provides a feedback signal $V_P$ as its output. A reference circuit 18 generates a stepwise high level signal which can be interpreted to correspond to the frequency (for example, 60 Hz) of the power source R, S, T when the passenger detection device 14 detects the 'presence' of a passenger, and a low level signal when it detects the 'absence' of a passenger. A gradient signal generator circuit 19 which produces a linear voltage ramp over time gently increases or decreases the stepped signal to produce a command signal $V_R$. An adder 20 adds the command signal $V_R$ and the feedback signal $V_P$ to produce a voltage signal $V_F$. A voltage-controlled oscillator 21 changes the oscillation frequency $f_i$ thereof in accordance with the voltage signal $V_F$, and the inverter 6 is subjected to an ignition control on the basis of the frequency $f_i$. Numeral 22 indicates a switching circuit which switches the power sources for the induction motor 1 in accordance with logic circuit which analyzes both command signal $V_R$ which corresponds to frequency and the phase difference signal $\Delta\phi$ for the first time when the command signal $V_R$ has come close to the corresponding power source frequency (by way of example, when $V_R$ corresponds to a frequency of 59.5 Hz), and the function of which is as stated below.

In the above close frequency state, under the condition of $\Delta\phi=0$, a contact 22a is opened to connect the amplifier 17. This contact remains open as long as both of the above conditions are met. In addition, (a) When a low speed operation is to be shifted to a high speed operation, the switching circuit 22 responds to $\Delta\phi=\Delta\phi_R$ to open the inverter contactor 7 and to close the up operation contactor U or down operation contactor D, and (b) when the high speed operation is to be shifted to the low speed operation, the switching circuit 22 responds to $\Delta\phi=\Delta\phi_R$ to open the up operation contactor U or down operation contactor D and to close the inverter contactor 7.

The details of the switching circuit 22 will be described with reference to FIGS. 3 and 4.

Figure 3:
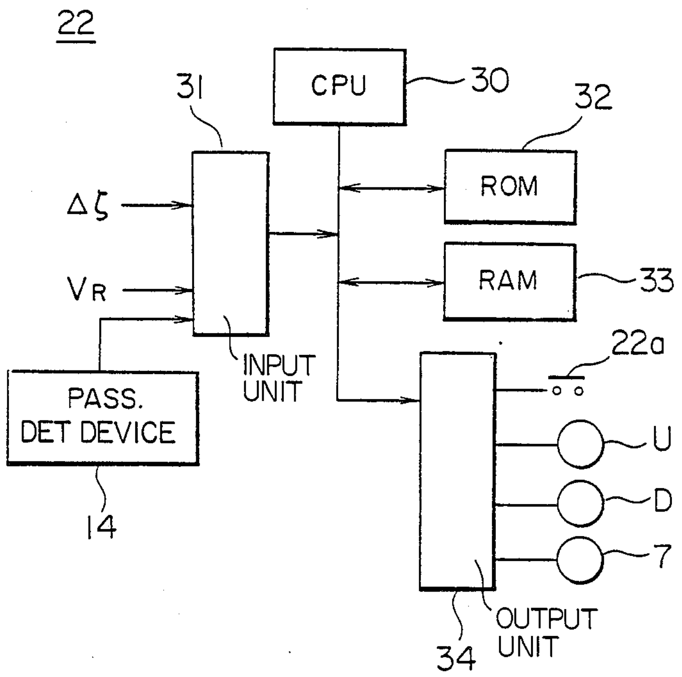
Figure 4:
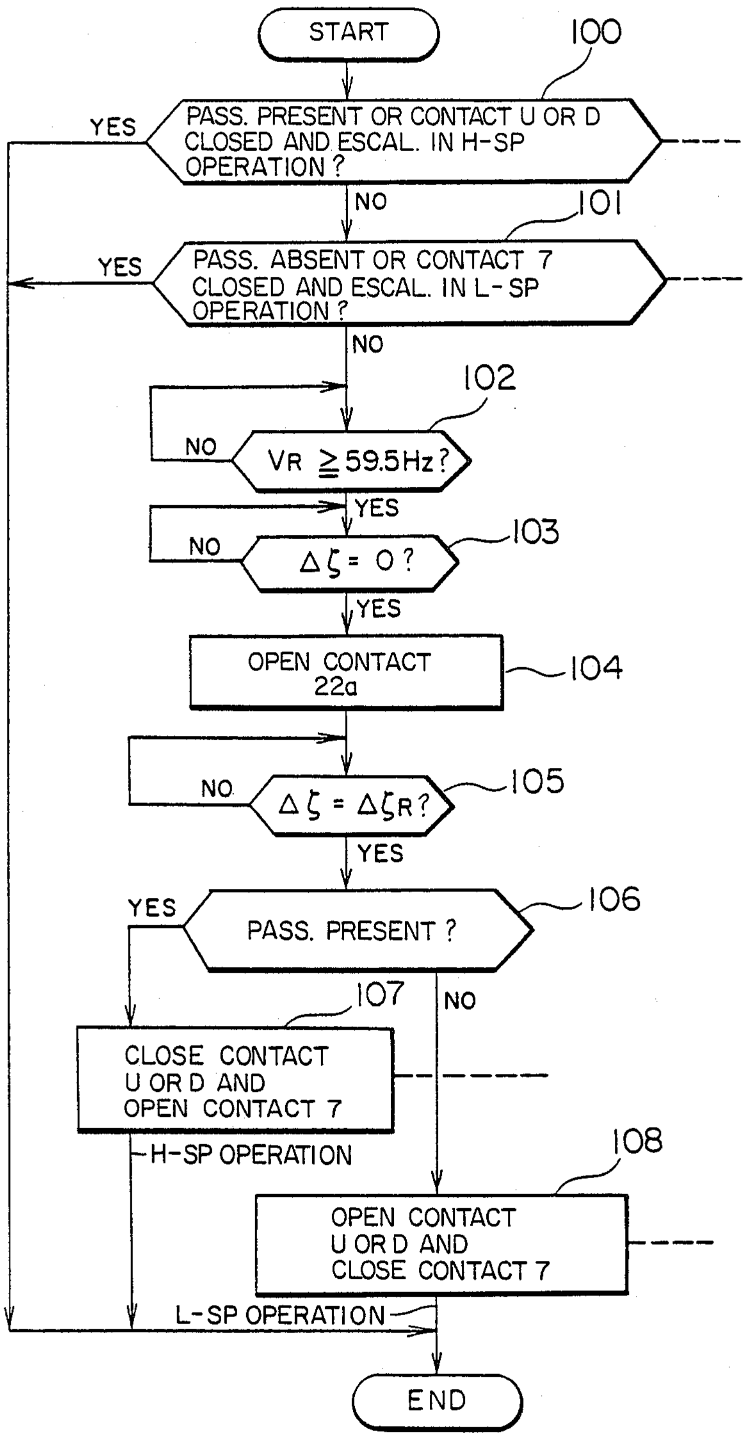

In FIG. 3, numeral 30 designates a central processing unit (CPU), numeral 31 an input unit which is supplied with the phase difference signal $\Delta\phi$, the command signal $V_R$ and the passenger 'presence' or 'absence' signal, numeral 32 a ROM in which a program shown in FIG. 4 is stored, and numeral 33 a RAM in which data is stored. An output unit 34 delivers a calculated result.

Next, the operation of the switching circuit 22 will be described with reference to FIG. 4.

At a step 100, when a passenger has been detected and the escalator is already in the high speed operation, the decision is YES, and the control process ends. If the escalator is not in the high speed operation, the decision becomes NO. At a step 101, if there is no passenger and the escalator is already in the low speed operation, the decision if YES, and the control process ends. If the escalator is not in the low speed operation, the decision becomes NO. That is, in a case where the switching from the low speed to the high speed or vice versa is required, the control flow proceeds to a step 102. At the step 102, the control process stands by until $V_R$ corresponds to a frequency of $\geqq$59.5 Hz holds. At a step 103, $\Delta\phi=0$ is checked. When this condition is met, the control flow shifts to a step 104, which gives the command of opening the contact 22a. At a step 105, $\Delta\phi=\Delta\phi_R$ is checked. When the presence of a passenger has been detected at a step 106, the control flow shifts to a step 107, at which the contactor U or D is closed to give the command of the high speed operation. When the absence of a passenger has been detected at the step 106, the control flow shifts to a step 108, at which the inverter contactor 7 is closed to give the command of the low speed operation.

Next, the operation of the control apparatus for the escalator according to this invention will be described with reference to FIGS. 1 and 2. The frequency of the three-phase A-C power source R, S, T is assumed to be 60 Hz.

(i) It is assumed that the escalator is to perform the up operation and that there is no passenger intending to use the escalator.

The switch S is thrown to the upper side. Although the up operation relay $U_R$ is energized to close the normally-open contact $U_4$, the switching circuit 22 is not in the operating state yet. Therefore, the up operation contactor U is not energized, but the contactor 7 for the thyristors is energized. In consequence, the induction motor 1 is controlled by the inverter 6. Since, on this occasion, the 'absence' of a passenger is output from the passenger detection device 14, the low level signal is output from the reference circuit 18. Also the command signal $V_R$ is at the low level. Since the contact 22a is closed, the voltage signal $V_F$=the command signal $V_R$ and the frequency $f_i$ becomes a low freqeuncy. A three-phase alternating current corresponding to this low frequency is produced from the inverter 6, and the induction motor 1 is operated at the low speed.

(ii) Subsequently, when a passenger who uses the escalator has been detected by the passenger detection device 14, the reference circuit 18 outputs the high level signal. Therefore, the command signal $V_R$ which is delivered from the gradient signal generator circuit 19 increases gradually from a time T to a time $t_0$ as illustrated in FIG. 2. When the command signal $V_R$ corresponds to 59.5 Hz at a time $t_0$, the switching circuit 22 detects this situation and opens the contact 22a. The amplifier 17 is connected into the circuit by the opening of this contact, and the signal $V_P$ based on the addition value between the phase difference signal $\Delta\phi$ and the bias signal $\phi_R$ is added to the command signal $V_R$ to form the votage signal $V_F$. As a result, the inverter 6 generates a frequency which is somewhat higher than that of the three-phase A-C power source R, S, T. The phase difference signal $\Delta\phi$ of two such somewhat different frequencies becomes zero over time. It is assumed that the synchromism (namely, $\Delta\phi=0$) has been detected in the switching circuit 22 at a time $t_1$ and that the switching command has been issued at a time $t_2$. After a proper time delay $t_d$, the voltage of the inverter 6 becomes zero at a time $t_3$. The contactor 7 for the inverter is deenergized several cycles later than the time $t_3$, and the normally-open contacts *7a*–*7c* are opened. Thereafter, the up operation contactor U is energized, and the normally-open contacts $U_1$–$U_3$ are closed at a time $t_4$. That is, the induction motor 1 is directly fed with electric power from the three-phase A-C power source R, S, T and performs the high speed operation.

Here, when the inverter 6 is switched to the three-phase A-C power source R, S, T, the supply of the electric power is cut off from the time $t_3$ to the time $t_4$ (for several cycles). Since, however, the inertia of the load (escalator) is great, it is conjectured that phase angles in the induction motor 1 will be changed 20 degrees–60 degrees relative to the three-phase A-C power source R, S, T by the momentary cutoff. The bias signal $\phi_R$ compensates for the change of the phase angle by the momentary cutoff.

More specifically, when the phase difference signal $\Delta\phi$ is zero, a value based on the bias signal $\phi_R$ is added, and hence, the alternating current produced by the inverter 6 somewhat (20 degrees–60 degrees) leads over the alternating current of the three-phase A-C power source R, S, T. Accordingly, when the normally-open contacts $U_1$–$U_3$ have been closed to connect the commercial power source at the time $t_4$, the phase angle of the voltage having been generated by the induction motor 1 up to that point in time then agrees with that of the three-phase A-C power source R, S, T.

(iii) When the passenger detection device 14 has detected the 'absence' of a passenger after the conveying of the passenger, the three-phase A-C power source R, S, T is switched to the inverter 6. The escalator is controlled similarly to the foregoing items (a) and (b) when it is gradually slowed down into the low speed operation by the inverter 6.

According to the embodiment, in the low speed mode, the frequency itself of the power source lowers under the control of the inverter 6, and hence, the induction motor 1 is operated near the synchronous speed thereof. Therefore, an efficient operation is realized. Moreover, when the three-phase A-C power source R, S, T and the inverter 6 are switched on, the phases are conformed, so that the switching is effected smoothly without a shock.

When the three-phase A-C power source R, S, T is switched to the inverter 6, no passenger is on the escalator, and hence, the generation of a shock forms no drawback. Accordingly, the acknowledgement of the synchronism is not always necessary.

In addition, since the operation by the inverter 6 corresponds to the absence of a passenger, the capacity of the inverter 6 may be small.

As stated above, this invention consists, in a control apparatus for an escalator wherein a low speed operation is performed in the absence of the user of the escalator, whereas a high speed operation is performed in the presence of the user, in that the alternating current of a three-phase A-C power source is converted by frequency conversion means into a three-phase alternating current of low frequency, with which an induction motor is energized to perform the low speed operation, so that the induction motor is rotated near a synchronous speed corresponding to the low frequency, to realize the low speed operation of high efficiency.

Moreover, when a user has been detected, the frequency of the alternating current from the conversion means is gradually raised, and the conversion means is thereafter switched to the three-phase A-C power source upon detecting the synchronism of this alternating current with the alternating current of the three-phase A-C power source, so that smooth switching free from a shock becomes possible.

What is claimed is:

1. A control apparatus for an escalator comprising an induction motor for driving the escalator, a passenger detection device for detecting the presence of passengers at the escalator, conversion means for converting an alternating current from a three-phase A-C power source into a three-phase alternating current of variable frequency, control means for controlling said conversion means by providing a controllable frequency signal thereto so that a generated alternating current of a frequency substantially lower than and of a phase different from that of the three-phase A-C power source is generated by said conversion means in response to the absence of the passengers at the escalator, said control means including phase detection means for detecting the different in phase between the generated alternating current and the source alternating current and for controlling the frequency signal in response to the presence of passengers at the escalator and in response to the detected different in phase, (1) gradually increasing the frequency of the generated alternating current until it surpasses the frequency of said source alternating current, and (2) subsequently decreasing the frequency of said generated alternating current so as to approach the frequency of said source alternating current, and switching means for connecting said induction motor to said conversion means in response to the absence of passengers so as to perform a low speed operation, and for connecting said induction motor to the three-phase A-C power source in response to the presence of passengers so as to perform a high speed operation when the frequency and phase of the generated alternating current are substantially equal to the frequency and phase of the A-C power source.

2. A control apparatus for an escalator as defined in claim 1 wherein when the absence of the passengers is detected after the high speed operation, said control means responds to the change to control said conversion means and gradually decreases the frequency of the generated alternating current to cause a gradual switch to the low speed operation.

3. A control apparatus for an escalator as defined in claim 2 including means connecting the output of said phase detection means to said oscillation means only when the frequency of the alternating current from said conversion means is substantially equal to that of the three-phase A-C power source, and disconnecting the output of said phase detection means from said oscillation means when the frequency of the alternating current from said conversion means differs from that of the three-phase A-C power source.

4. A control apparatus for an escalator as defined in claim 2 wherein the output of said phase detection means includes a predetermined bias added thereto which is then supplied to said oscillation means.

5. A control apparatus for an escalator as defined in claim 4 wherein, when the low speed operation is to be shifted to the high speed operation, said switching means is operable, in response to said phase detection means detecting synchronism of both the phases of the generated alternating current and the source alternating current, to perform a switching operation for separating said conversion means from said induction motor and for connecting the three-phase A-C power source to said induction motor.

6. A control apparatus for an escalator as defined in claim 5 wherein said switching means is operable to perform an operation for separating said conversion means and said induction motor and thereafter for connecting the three-phase A-C power source and said induction motor.

7. A control apparatus for an escalator as defined in claim 4 wherein, when the high speed operation is to be shifted to the low speed operation, said switching means is operable, in response to said phase detection means detecting synchronism of both the phases of the generated current and the source alternating current, to perform a switching operation for separating the three-phase A-C power source from said induction motor and for connecting said conversion means to said induction motor.

* * * * *